(12) United States Patent
Kim (10) Patent No.: US 8,103,814 B2
(45) Date of Patent: Jan. 24, 2012

(54) ELECTRONIC APPARATUS AND DATA SENDING/RECEIVING METHOD THEREOF

(75) Inventor: Kyu-sung Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 92 days.

(21) Appl. No.: 12/039,986

(22) Filed: Feb. 29, 2008

(65) Prior Publication Data

US 2008/0313373 A1    Dec. 18, 2008

(30) Foreign Application Priority Data

Jun. 12, 2007   (KR) ................. 10-2007-0057471

(51) Int. Cl.
*G06F 13/00* (2006.01)
*G06F 13/14* (2006.01)
*G06F 1/00* (2006.01)

(52) U.S. Cl. .......... 710/110; 710/35; 710/305; 713/300; 713/320; 713/323; 713/324; 702/57; 455/127.1; 324/539

(58) Field of Classification Search ............ 710/35
See application file for complete search history.

(56) References Cited

U.S. PATENT DOCUMENTS

| | | | | |
|---|---|---|---|---|
| 5,634,138 A * | 5/1997 | Ananthan et al. | ............... | 710/21 |
| 5,796,963 A * | 8/1998 | Odom | ............... | 710/310 |
| 5,838,334 A * | 11/1998 | Dye | ............... | 345/503 |
| 5,918,072 A * | 6/1999 | Bhattacharya | ............... | 710/35 |
| 6,185,637 B1 * | 2/2001 | Strongin et al. | ............... | 710/35 |
| 6,393,500 B1 * | 5/2002 | Thekkath | ............... | 710/35 |
| 6,457,075 B1 * | 9/2002 | Koutsoures | ............... | 710/35 |
| 6,546,496 B1 * | 4/2003 | Wang et al. | ............... | 713/322 |
| 6,771,269 B1 * | 8/2004 | Radecki et al. | ............... | 345/503 |
| 6,957,308 B1 * | 10/2005 | Patel | ............... | 711/154 |
| 7,616,207 B1 * | 11/2009 | Diard et al. | ............... | 345/506 |
| 2006/0143330 A1 * | 6/2006 | Kiehl | ............... | 710/35 |
| 2007/0016724 A1 * | 1/2007 | Gaither et al. | ............... | 711/105 |
| 2010/0017547 A1 * | 1/2010 | Das et al. | ............... | 710/35 |

OTHER PUBLICATIONS

PCI Local Bus Specification—Revision 2.3; Dated Mar. 29, 2002—328 pages.*
PCI Express Base Specification Revision 1.0a; Apr. 15, 2003—428 pages.*
Tanenbaum—"Hardware/Software Tradeoffs: A General Design Principle?"—3 pages dated Jan. 25, 1985.*

* cited by examiner

*Primary Examiner* — Brian Misiura
(74) *Attorney, Agent, or Firm* — Stanzione & Kim, LLP (57) ABSTRACT

An electronic apparatus to allow data to be sent and received between a master unit and a slave unit through a peripheral component interconnect (PCI) bus is provided. Each of the master unit and the slave unit comprises a data interface having a plurality of pins through which request data is sent to and received from an external device, and additional pins through which size information of the request data is sent to and received from the external device. If the master unit sends address information and the size information of the request data to the slave unit through the plurality of pins and the additional pins, the slave unit processes data of an address corresponding to the received address information according to size corresponding to the size information.

18 Claims, 5 Drawing Sheets

FIG. 5

ELECTRONIC APPARATUS AND DATA SENDING/RECEIVING METHOD THEREOF

CROSS-REFERENCE TO RELATED APPLICATIONS

This application claims priority under 35 U.S.C. §119(a) from Korean Patent Application No. 10-2007-0057471, filed on Jun. 12, 2007 in the Korean Intellectual Property Office, the disclosure of which is incorporated herein in its entirety by reference.

BACKGROUND OF THE INVENTION

1. Field of the Invention

Apparatuses and methods consistent with the present general inventive concept relate to an electronic apparatus and a data sending/receiving method thereof, and more particularly, to an electronic apparatus to send and receive data through a peripheral component interconnect (PCI) interface and a data sending/receiving method thereof.

2. Description of the Related Art

Electronic apparatuses send and receive data and process the data. Among the electronic apparatuses, an electronic apparatus that processes data through a PCI interface has an advantage that a plurality of peripheral devices which are linked through a PCI bus can send data directly onto the PCI bus without the help of a central processing unit (CPU).

Here, a plurality of peripheral devices linked to the PCI bus is classified into a master unit which requests other peripheral devices to read or write data, and a slave unit which receives a data-read or data-write request from the master unit and performs a data-read or data-write operation with respect to data according to the data-read or data-write request. Each peripheral device acts as a master unit when requesting data, and acts as a slave unit that processes data.

Further, a slave unit of an electronic apparatus which operates with a conventional PCI interface cannot know a burst length that the master unit requires, that is, size of data, when the master unit gains access to the slave unit.

Therefore, a conventional slave unit defines an arbitrary burst length and processes data according to a request of a master unit, or processes data in a preset small burst length. However, there are problems that a data process time of the slave unit is delayed if a size of a burst length of data is smaller than the size of request data that is processed, and the size of the burst length of data that is larger in size than the request data is not efficiently processed.

SUMMARY OF THE INVENTION

The present general inventive concept provides an electronic apparatus and a data sending/receiving method thereof which can send and receive size information of request data along with address information with respect to an external electronic apparatus, to thereby perform quick and efficient data processing.

The present general inventive concept also provides an electronic apparatus and a data sending/receiving method thereof in which a slave unit processes data according to a predetermined size, even when a master unit cannot generate a signal corresponding to size information of request data, to thereby increase compatibility with a conventional peripheral component interconnect (PCI) electronic apparatus.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept are performed by providing an electronic apparatus including a master unit and a slave unit to communicate with each other through a peripheral component interconnect (PCI) bus, each of the master unit and the slave unit includes a data interface having a plurality of pins through which request data is sent to and received from an external device, and additional pins through which size information of the request data is sent to and received from the external device, wherein if the master unit sends address information and the size information of the request data to the slave unit through the plurality of pins and the additional pins, the slave unit processes data of an address corresponding to the received address information according to size corresponding to the size information.

The slave unit may process the request data according to a predetermined size, if the master unit cannot generate a signal corresponding to the size information of the request data.

The slave unit may further include at least one internal electronic unit which is linked with an internal data bus and in which data is stored, and wherein if the slave unit receives the address information and the size information, the address information and the size information is sent to the internal electronic unit corresponding to the received address information to process the data.

The master unit may send the address information and the size information to the slave unit at the same time.

The foregoing and/or other aspects and utilities of the present general inventive concept are also performed by providing an data sending/receiving method usable with an electronic apparatus which allows data to be sent and received between a master unit and a slave unit through a peripheral component interconnect (PCI) bus, the data sending/receiving method including sending, by the master unit, address information of request data to the slave unit through the plurality of pins of a data interface, sending, by the master unit, size information to the slave unit through additional pins of the data interface, and processing, by the slave unit, data of an address corresponding to the received address information according to a size corresponding to the size information.

The sending, by the slave unit, the data to the master unit may include processing, by the slave unit, the request data according to a predetermined size, if the master unit cannot generate a signal corresponding to the size information of the request data.

The slave unit may further include at least one internal electronic unit which is linked with an internal data bus and in which data is stored, and wherein the processing, by the slave unit, the data may further include sending the address information and the size information to the internal electronic unit corresponding to the received address information, if the slave unit receives the address information and the size information.

The sending, by the master unit, the size information to the slave unit may include sending the size information to the slave unit together with the address information.

The sending, by the master unit, the size information to the slave unit may include sending the size information to the slave unit together with the address information.

The data sending/receiving method may further include sending a command to read and write the request data to the slave unit, together with the address information and the size information.

The foregoing and/or other aspects and utilities of the general inventive concept may also be achieved by providing an electronic device usable with a peripheral device having a master unit and a slave unit, the electronic device comprising a master unit and a slave unit, each having a data interface having a first set of pins through which request data is sent to and received from the peripheral device bus and a second set of pins through which size information of the request data is sent to and received from the peripheral device through a peripheral component interconnect (PCI) bus, wherein the slave unit of the peripheral device processes data of an address corresponding to address information and size information provided by the master unit of the electronic device corresponding to the size information.

The foregoing and/or other aspects and utilities of the general inventive concept may also be achieved by providing an electronic system, comprising a peripheral component interconnect (PCI) bus, a plurality of peripheral devices coupled to the PCI bus to communicate with each other, each of the plurality of peripheral devices comprises a master unit and a slave unit, each having a data interface having a first set of pins through which request data is sent to and received from one or more peripheral devices and a second set of pins through which size information of the request data is sent to and received from one or more peripheral devices, wherein a respective slave unit processes data of an address corresponding to address information and size information provided by a respective master unit corresponding to the size information.

The foregoing and/or other aspects and utilities of the general inventive concept may also be achieved by providing a method of communication between a plurality of devices through a peripheral component interconnect (PCI) bus, the method comprising communicating request data between a master unit of one device of the plurality of devices and a slave unit of an other device of the plurality of devices through a first set of pins of a data interface thereof and communicating size information of the request data between the master unit of the one device of the plurality of devices and the slave unit of the other device of the plurality of devices through a second set of pins of the data interface thereof.

The foregoing and/or other aspects and utilities of the general inventive concept may also be achieved by providing a computer-readable recording medium having embodied thereon a computer program to execute a method, wherein the method comprises communicating request data between a master unit of one device of a plurality of devices and a slave unit of an other device of the plurality of devices through a first set of pins of a data interface thereof and communicating size information of the request data between the master unit of the one device of the plurality of devices and the slave unit of the other device of the plurality of devices through a second set of pins of the data interface thereof.

The foregoing and/or other aspects and utilities of the general inventive concept may also be achieved by providing a slave device usable with an electronic apparatus, the slave device comprising an internal data bus to transmit information therein, a data interface to send and receive data to and from a master device and a plurality of internal electronic units to receive address information and size information of requested data from the master device and processes the requested data of an address corresponding to the received address information according to a size corresponding to the received size information, each of the plurality of internal electronic units to receive the address information and the size information from the master device through the data interface and the internal data bus.

BRIEF DESCRIPTION OF THE DRAWINGS

The above and/or other aspects and utilities of the present general inventive concept will become apparent and more readily appreciated from the following description of the exemplary embodiments, taken in conjunction with the accompanying drawings in which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 1:
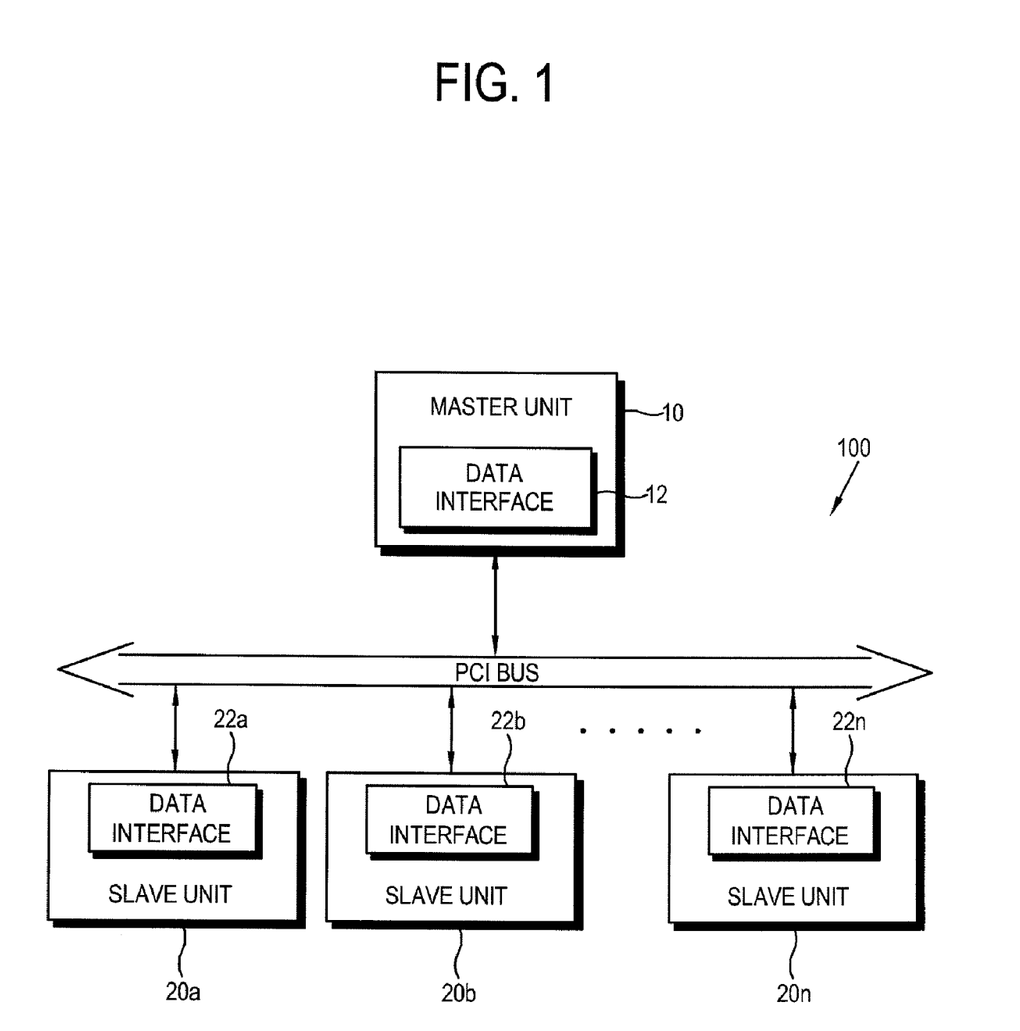
FIG. 1 is a block diagram illustrating a configuration of an electronic apparatus according to an exemplary embodiment of the present general inventive concept.

FIG. 1 is a block diagram illustrating a configuration of an electronic apparatus 100 according to an exemplary embodiment of the present general inventive concept. As illustrated in FIG. 1, the electronic apparatus 100 according to the present exemplary embodiment includes a plurality of peripheral devices which are mutually linked via a peripheral component interconnect (PCI) bus. Here, the respective peripheral devices which are mutually linked via the PCI bus are classified into a master unit 10 and at least one slave unit 20 (that is, 20a, 20b, and 20n). The master unit 10 requests the slave unit 20 to read or write data.

Respective data interfaces 12 and 22 (22a, 22b, . . . 22n) which are included in the master unit 10 and the slave unit 20 include a plurality of pins (not illustrated) through which request data is sent to and received from an external device, and additional pins (not illustrated) through which size information of the request data is sent to and received from the external device.

The address information of the request data and a signal corresponding to a command such as a read-command or write-command for the request data are sent to and received from the external device through the plurality of pins which are included in the data interfaces 12 and 22 and through which request data is sent to and received from the external device.

In addition, a signal corresponding to a burst length of the request data, that is, the size information of the data, is sent to and received from the external device through additional pins (not illustrated) through which size information of the request data is sent to and received from the external device. Here, extra pins which are provided in the conventional PCI interface are used as the additional pins sending and receiving size information of data.

Alternatively, where the master unit 10 cannot generate a signal corresponding to size information of request data via a conventional PCI interface, in the electronic apparatus 100 according to the present exemplary embodiment, a default value, for example, a pull-up signal corresponding to deactivation of data is sent to the slave unit 20, through the data interface 22. Here, the slave unit 20 processes data according to a predetermined size. Accordingly, compatibility can be maximized even where a conventional PCI device which cannot send size information of data acts as the master unit 10.

Figure 2:
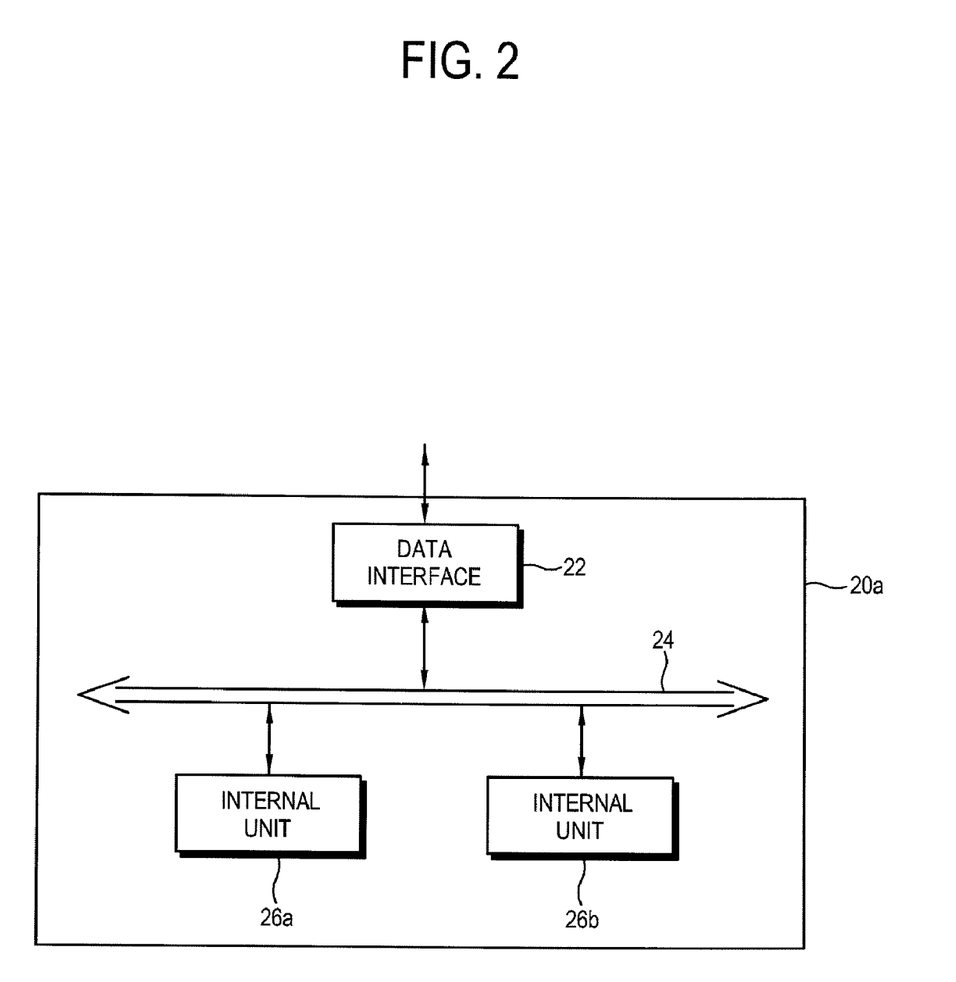
FIG. 2 is a block diagram illustrating a configuration of an electronic apparatus according to another exemplary embodiment of the present general inventive concept.

Herein below, an electronic apparatus according to another exemplary embodiment of the present general inventive concept will be described with reference to FIG. 2. FIG. 2 illustrates only a slave portion of this embodiment since other portions of the electronic apparatus of this embodiment are similar to those of FIG. 1. As illustrated in FIG. 2, the electronic apparatus according to another exemplary embodiment of the present general inventive concept further includes an internal data bus 24 and internal electronic units 26a, 26b, . . . and 26n within a slave unit 200.

With respect to the electronic apparatus according to the exemplary embodiment as illustrated in FIG. 2, the slave unit 200 thereof sends received address information and size information to the internal electronic unit 26a and 26b corresponding to the received address information, if the master unit 10 (FIG. 1) sends address information and size information of request data to the slave unit 200. As a result, the internal electronic unit 26a and 26b processes request data of an address corresponding to the received address information according to a size corresponding to the received size information.

Figure 3:
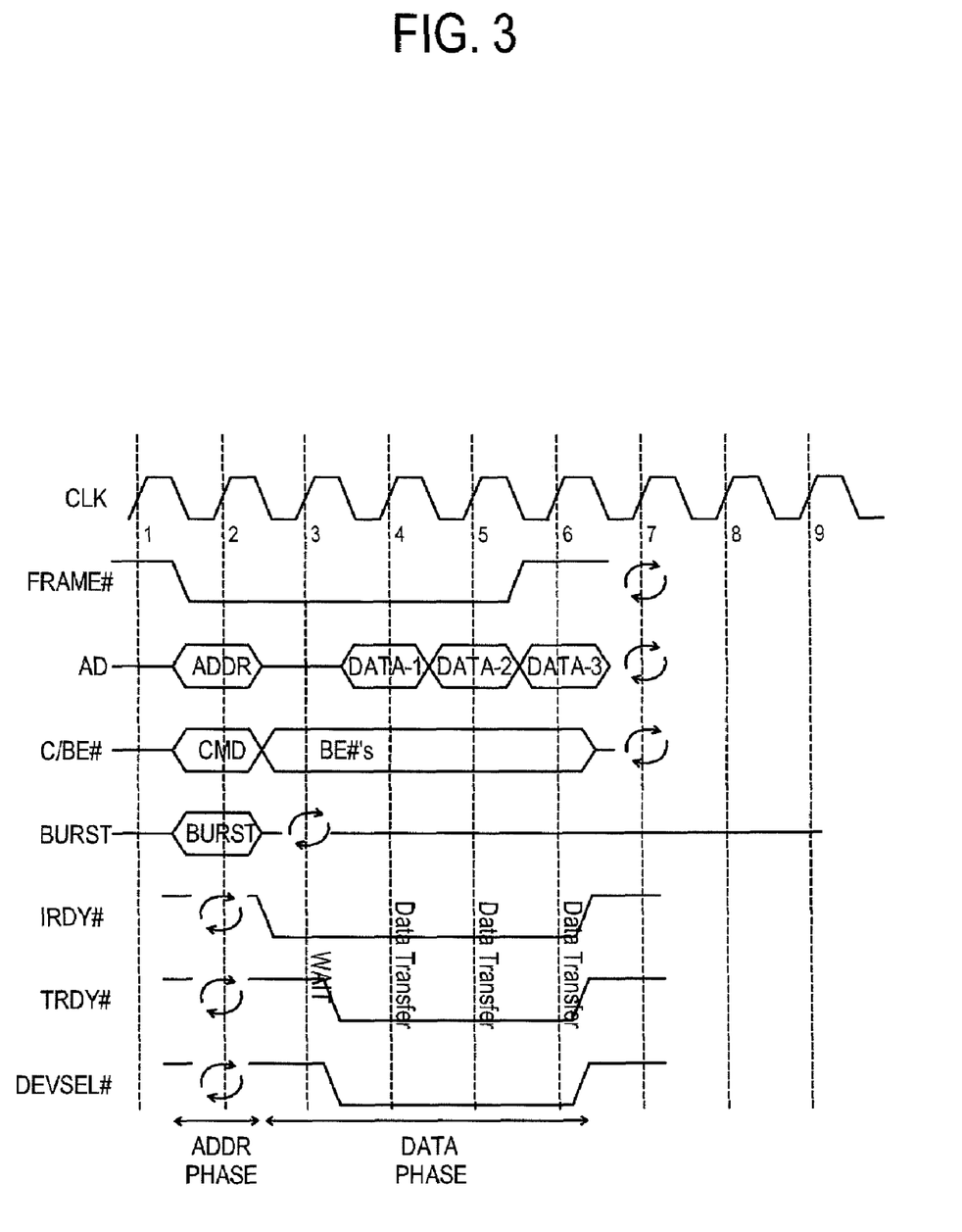
FIG. 3 is a waveform diagram illustrating control signals to control an electronic apparatus to send and receive data according to an exemplary embodiment of the present general inventive concept.

Herein below, control signals to control the electronic apparatus 100 in the embodiment illustrated in FIG. 1 to send and receive data will be described with reference to FIG. 3. Referring to FIGS. 1 and 3, a clock signal CLK, a frame signal FRAME#, an address and data signal AD, a command and byte signal C/BE#, a burst signal BURST, ready signals IRDY# and TRDY# and a device selection signal DEVSEL# are sent and received between the master unit 10 and the slave unit 20 in the electronic apparatus 100 in the embodiment illustrated in FIG. 1 through the data interfaces 12 and 22.

Referring to FIG. 3, the clock signal CLK provides reference time with respect to all transfer actions to send and receive data on a PCI bus. All signals except a reset signal or an interrupt signal are synchronized with the clock signal CLK.

The frame signal FRAME# is applied in a low state when there is a new bus transaction, that is, a sending/receiving action for request data. Here, when the transaction occurs for one data, the frame signal is changed to a high state if one clock cycle passes. When the transaction occurs for multiple data, the frame signal maintains the low state until a request for last data is accomplished.

Referring to FIG. 3, the address and data signal AD is a control signal to send and receive physical address information and data information. The address information is sent and received during an interval of an address phase ADDR PHASE. The address phase occurs when a frame signal is changed from the high state to the low state. Data information is sent and received during an interval of respective data phases DATA-1, DATA-2, . . . The data phase occurs when all ready signals to be described later are at the low state.

The command and byte signal C/BE# includes type information of a command during the address phase interval and byte enable information during the data phase interval. The type of the command which is sent and received during the address phase interval includes I/O read and write, memory read and write, etc.

Referring to FIG. 3, the burst signal BURST represents size information of data which is sent and received by a one-time transaction. In the embodiment illustrated in FIG. 1, the electronic apparatus 100 sends and receives the burst signal together with a read or write command signal during the address phase interval, to thereby efficiently perform a transaction of data.

Referring to FIGS. 1 and 3, the ready signals include an Initiator Ready signal IRDY# which is applied in a low state when it is ready to complete a present data phase of a transaction, and a Target Ready signal TRDY# which informs the electronic apparatus 100 that it is ready to receive data while the master unit 10 performs a write operation of data, and informs the electronic apparatus 100 that it is ready to send data while the master unit 10 performs a read operation of data.

The device selection signal DEVSEL# is activated into a low state, where the slave unit 20 detects address information to gain access to the respective internal electronic unit 26a and 26b on the internal data bus.

Figure 4:
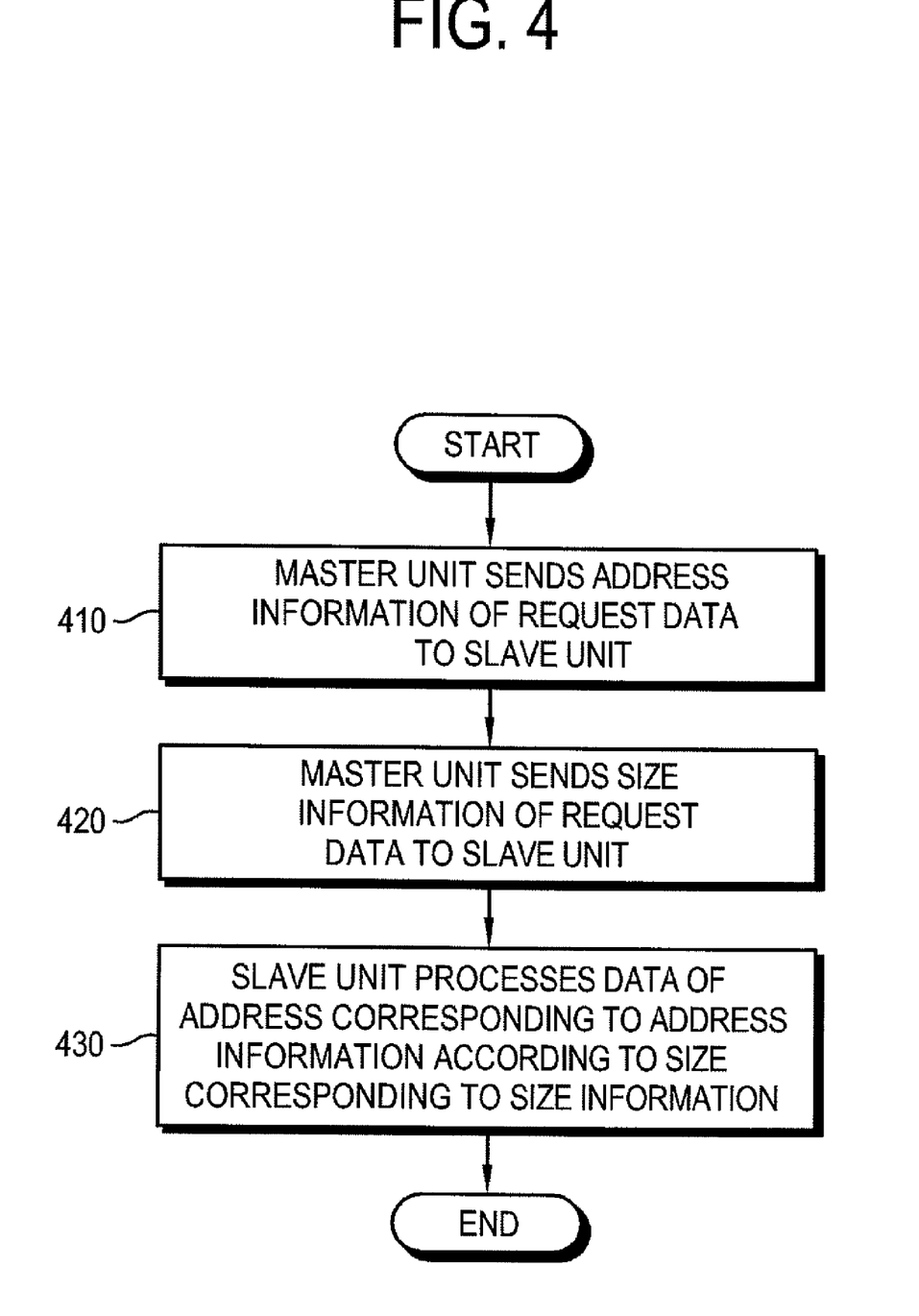
FIG. 4 is a flowchart view illustrating a data sending/receiving method of an electronic apparatus according to an exemplary embodiment of the present general inventive concept.

Herein below, a data sending/receiving method of the electronic apparatus 100 according to an exemplary embodiment of the present general inventive concept will be described with reference to FIG. 4.

First, the master unit 10 sends address information of request data to the slave unit 20 through a plurality of pins through which data is sent and received (operation 410). Then, the master unit 10 sends size information of request data through additional pins through which the size information of request data is sent and received (operation 420). Here, the master unit 10 can send the address information of the request data and the size information of the request data at the same time during the address phase interval.

In operation 430 the slave unit 20 processes data of an address that corresponds to the address information received in operation 410, according to a size that corresponds to the size information received in operation 420.

Figure 5:
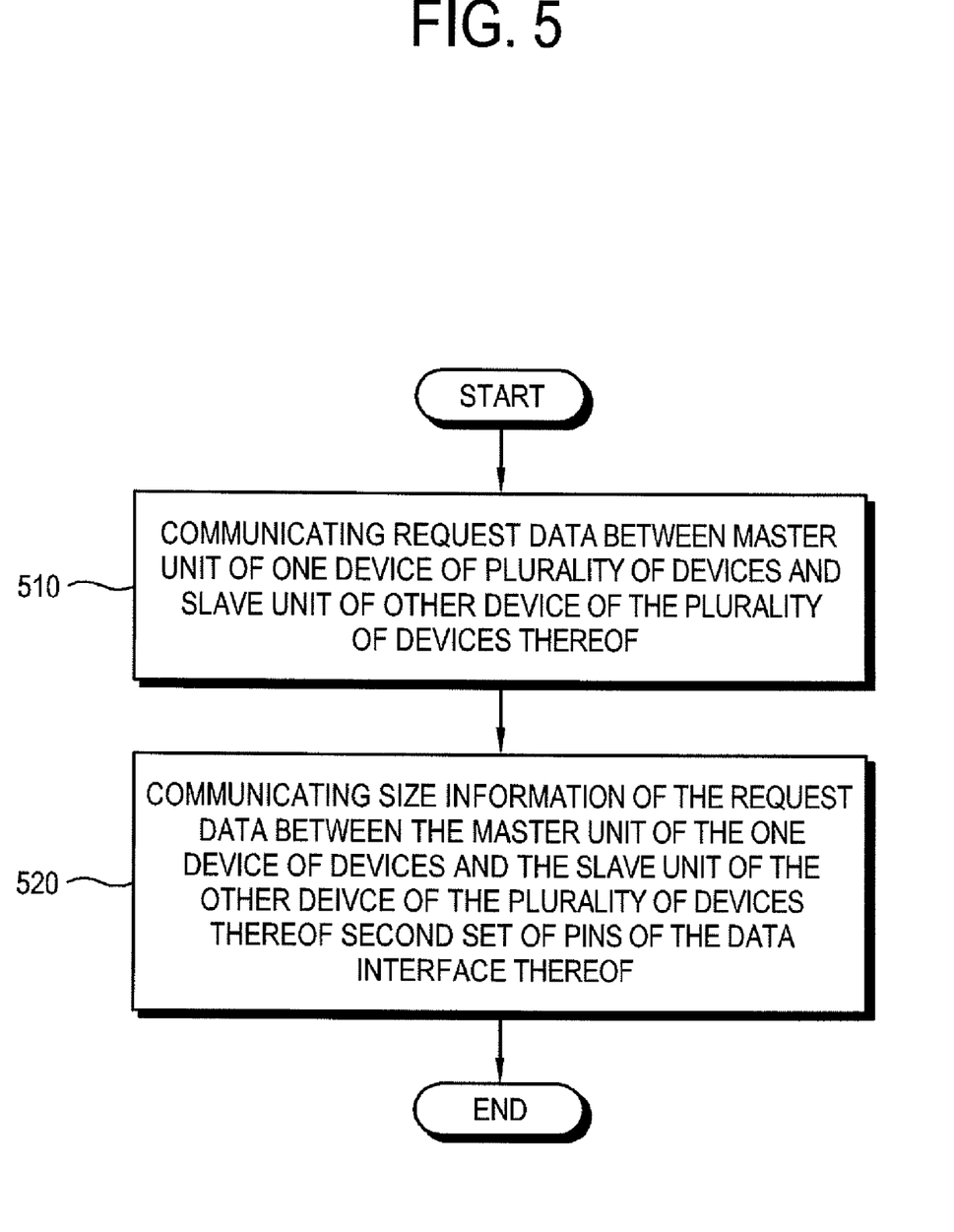
FIG. 5 is a flowchart illustrating a method of communication between a plurality of devices through a PCI bus according to an exemplary embodiment of the present invention.

FIG. 5 is a flowchart illustrating a method of communication between a plurality of devices through a PCI bus according to an exemplary embodiment of the present general inventive concept. Referring to FIG. 5, in operation 510, request data is communicated between a master unit of one device of a plurality of devices and a slave unit of an other device of the plurality of devices through a first set of pins of a data interface thereof. In operation 520, size information of the request data is communicated between the master unit of the one device of the plurality of devices and the slave unit of the other device of the plurality of devices through a second set of pins of the data interface thereof.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As described above, the electronic apparatus and the data sending/receiving method according to various embodiments of the present general inventive concept send and receive size information of request data with respect to an external electronic apparatus, together with address information, thereby being capable of processing the data quickly and efficiently.

In addition, in the case of the electronic apparatus and the data sending/receiving method according to the present general inventive concept, even when the master unit cannot generate a signal corresponding to size information of request data, the slave unit processes data according to a predetermined size, to accordingly increase compatibility with a conventional PCI electronic apparatus.

Although various exemplary embodiments of the present general inventive concept have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. An electronic apparatus, comprising:
a master unit and a slave unit to communicate with each other through a peripheral component interconnect (PCI) bus, each of the master unit and the slave unit comprises:
a data interface having a plurality of pins through which request data is sent to and received from an external device, the request data including address information and command information corresponding to the address information; and
additional pins through which size information of the request data is sent to and received from the external device,
wherein if the master unit sends address information and the size information of the request data to the slave unit through the plurality of pins and the additional pins, the slave unit processes data of an address corresponding to the received address information according to size corresponding to the size information.

2. The electronic apparatus according to claim 1, wherein the slave unit processes the request data according to a predetermined size, if the master unit cannot generate a signal corresponding to the size information of the request data.

3. The electronic apparatus according to claim 1, wherein the slave unit further comprises:
at least one internal electronic unit which is linked with an internal data bus and in which data is stored, and wherein if the slave unit receives the address information and the size information, the address information and the size information is sent to the internal electronic unit corresponding to the received address information to process the data.

4. The electronic apparatus according to claim 3, wherein the master unit sends the address information and the size information to the slave unit at the same time.

5. The electronic apparatus according to claim 2, wherein the master unit sends the address information and the size information to the slave unit at the same time.

6. The electronic apparatus according to claim 1, wherein the master unit sends a command to read and/or write the request data to the slave unit together with the address information and the size information.

7. A data sending/receiving method usable with an electronic apparatus which allows data to be sent and received between a master unit and a slave unit through a peripheral component interconnect (PCI) bus, the data sending/receiving method comprising:
sending, by the master unit, address information and command information of request data to the slave unit through a plurality of pins of a data interface;
sending, by the master unit and at the same time as the address information, size information to the slave unit through additional pins of the data interface; and
processing, by the slave unit, data of an address corresponding to the received address information according to a size corresponding to the size information.

8. The data sending/receiving method of claim 7, wherein the sending, by the slave unit, the data to the master unit comprises:
processing, by the slave unit, the request data according to a predetermined size, if the master unit cannot generate a signal corresponding to the size information of the request data.

9. The data sending/receiving method of claim 7, wherein the slave unit further comprises:
at least one internal electronic unit which is linked with an internal data bus and in which data is stored; and
wherein the processing, by the slave unit, the data further comprises:
sending the address information and the size information to the internal electronic unit corresponding to the received address information, if the slave unit receives the address information and the size information.

10. An electronic device comprising:
a master unit and a slave unit, each having a data interface having a first set of pins through which request data is sent to and received from a peripheral component interconnect (PCI) bus and a second set of pins through which size information of the request data is sent to and received from the PCI bus,
wherein the request data includes address information and command information corresponding to the address information, and
the slave unit processes data of an address corresponding to the address information and size information provided by the master unit of the electronic device corresponding to the size information.

11. An electronic system, comprising:
a peripheral component interconnect (PCI) bus;
a plurality of peripheral devices coupled to the PCI bus to communicate with each other, each of the plurality of peripheral devices comprising:
a data interface having a first set of pins through which request data including address information and command information corresponding to the address information is sent to and received from one or more of the peripheral devices and a second set of pins through which size information of the request data is sent to and received from one or more of the peripheral devices,
wherein each of the peripheral devices may act as a master unit and a slave unit, and
wherein a respective slave unit processes data of an address corresponding to the address information and size information provided by a respective master unit corresponding to the size information.

12. The electronic apparatus according to claim 11, wherein each of the slave units further comprises:
 at least one internal electronic unit coupled to an internal data bus to store data,
 wherein address information and size information received by the respective slave unit is sent to the internal electronic unit corresponding to the received address information to process the data.

13. A method of communication between a plurality of devices through a peripheral component interconnect (PCI) bus, the method comprising:
 communicating request data including address information and command information corresponding to the address information between a master unit of one device of the plurality of devices and a slave unit of an other device of the plurality of devices through a first set of pins of a data interface thereof; and
 communicating size information of the request data between the master unit of the one device of the plurality of devices and the slave unit of the other device of the plurality of devices through a second set of pins of the data interface thereof at the same time as communicating the request data including address information.

14. The method of claim 13, further comprising:
 processing data of an address corresponding to the address information and size information provided by the master unit corresponding to the size information.

15. A computer-readable storage medium having embodied thereon a computer program to execute a method, wherein the method comprises:
 communicating request data including address information and command information corresponding to the address information between a master unit of one device of a plurality of devices and a slave unit of an other device of the plurality of devices through a first set of pins of a data interface thereof; and
 communicating size information of the request data between the master unit of the one device of the plurality of devices and the slave unit of the other device of the plurality of devices through a second set of pins of the data interface thereof at the same time as communicating the request data including address information.

16. A slave device usable with an electronic apparatus, the slave device comprising:
 an internal data bus to transmit information therein;
 a data interface including a first plurality of pins to send and receive data including address information and command information corresponding to the address information to and from a master device, and at least one second pin to transmit and receive size information of requested data to and from the master device; and
 a plurality of internal electronic units to receive the address information and size information of requested data from the master device during an address phase and processes the requested data of an address corresponding to the received address information according to a size corresponding to the received size information, each of the plurality of internal electronic units to receive the address information and the size information from the master device through the data interface and the internal data bus.

17. The slave device of claim 16, wherein the slave device detects the address information to gain access to the respective internal electronic units on the internal data bus.

18. An electronic device which communicates with one or more peripheral devices through a peripheral component interconnect (PCI) bus, the electronic device comprising:
 a plurality of data request pins to send and receive request data including address information and command information corresponding to the address information to and from the one or more peripheral devices; and
 at least one size information pin to send and receive size information of the request data to and from the one or more peripheral devices at the same time that the plurality of data requests pins sends requests data including address information.

* * * * *